United States Patent [19]

Kemp

[11] 3,725,367
[45] Apr. 3, 1973

[54] PREPARATION WITH SEEDING OF POLYMERS INSOLUBLE IN THEIR MONOMERIC COMPOSITIONS

[75] Inventor: Thomas Kemp, 92-Bois-Colombes, France

[73] Assignee: Produits Chimiques Pechiney-Saint-Gobain, Neuilly-sur-Seine, France

[22] Filed: May 15, 1970

[21] Appl. No.: 37,852

[30] Foreign Application Priority Data

May 19, 1969 France..................................6916089

[52] U.S. Cl...........260/80.81, 260/87.1, 260/87.5 C, 260/87.5 R, 260/87.7, 260/92.8 N, 260/878 R, 260/884
[51] Int. Cl............C08f 1/11, C08f 1/13, C08f 15/00
[58] Field of Search......260/878, 92.8 W, 884, 80.81

[56] References Cited

UNITED STATES PATENTS

| | | | |
|---|---|---|---|
| 3,332,918 | 7/1967 | Benetta et al. | 260/92.8 W |
| 3,383,346 | 5/1968 | Smith | 260/92.8 W |
| 3,458,467 | 7/1969 | Herrle et al. | 260/92.8 W |
| 2,961,432 | 11/1960 | Fikentscher et al. | 260/92.8 R |
| 3,370,105 | 2/1968 | De Bell et al. | 260/884 |
| 3,544,280 | 12/1970 | Thomas | 260/92.8 R |
| 3,522,227 | 7/1970 | Thomas | 260/92.8 R |
| 3,397,165 | 8/1968 | Goodman et al. | 260/879 |
| 3,373,228 | 3/1968 | Glazer et al. | 260/884 |

FOREIGN PATENTS OR APPLICATIONS 557,663  6/1957  Belgium..........................260/92.8 W

*Primary Examiner*—Joseph L. Schofer
*Assistant Examiner*—A. Holler
*Attorney*—McDougall, Hersh & Scott

[57] ABSTRACT

Vinyl based polymers and copolymers and method for the preparation of same by first preparing a seeding latex by polymerization in fine suspension of monomers or comonomers having a vinyl base, preferably vinyl chloride, with an excess amount of organo-soluble catalyst and dispersing the seeding latex in monomers or comonomers having the vinyl base to form a polymerizing composition which is polymerized by heating.

28 Claims, No Drawings

PREPARATION WITH SEEDING OF POLYMERS INSOLUBLE IN THEIR MONOMERIC COMPOSITIONS

This invention relates to vinyl based polymers and copolymers which are insoluble in their monomeric or comonomeric compositions and to a process for the preparation of same with a seeding mixture.

It is an object of this invention to produce and to provide a method for producing polymers or copolymers based upon a vinyl monomer, preferably vinyl chloride, having a narrow granular distribution within the range of 10 to 50 microns and preferably 20 to 40 microns.

The objects of this invention reside in a process for dispersing, in finely divided form, an aqueous seeding latex of a polymer or copolymer previously prepared by polymerization or copolymerization in fine suspension and containing at least a catalyst of the organo-soluble type, in a monomeric or comonomeric composition having a vinyl base, and preferably vinyl chloride, and then polymerizing the composition.

In an advantageous modification of the process of this invention, after the preparation of the aqueous seeding latex, a finely divided dispersion thereof in the monomeric or comonomeric composition, based upon vinyl chloride, is achieved and then the prepared reaction composition is subjected to polymerization with agitation at moderate speed.

Use is made of a seeding latex containing 30 to 48 percent by weight and preferably 40 to 45 percent by weight of the polymer or copolymer particles, in which the polymer copolymer particles have a diameter within the range of 0.03 to 4 microns and preferably 0.1 to 2 microns.

Preparation of the aqueous seeding latex in fine suspension makes use of water, a monomeric or comonomeric composition of the vinyl type, preferably vinyl chloride, a dispersing agent and at least one catalyst of the organo-soluble type. The concentration of the monomeric or comonomeric composition is generally within the range of 20 to 55 percent and preferably within the range of 40 to 45 percent by weight based upon the entire quantity of the reaction mixture. The organic composition is finely dispersed in water by means of vigorous shearing action, such as obtained for instance by a homogenizer operating under high pressure or a turbine rotating at high speed. The fine suspension is heated under autogenous pressure and under moderate agitation at a temperature which depends upon the characteristics of the product which is desired to be obtained.

At the end of the polymerization, heating is discontinued and unconverted monomer or monomers are removed by vaporization or degassing.

As the dispersing agent, use can be made of one or more protective colloids or one or more emulsifiers in an amount within the range of 0.2 to 5 percent and generally within the range of 1 to 3 percent by weight, based upon the weight of monomer or comonomer. The protective colloids are selected of those usually employed in fine suspension polymerization, such for example as polyvinyl alcohol, methyl cellulose, carboxy cellulose and gelatin. The emulsifiers of the anionic type can be represented by the alkylarylsulfonates, alkylsulphates and fatty acid salts of alkali metals. Such emulsifiers may be used alone or in combination one with another or with emulsifiers of the non-ionic type, such as fatty alcohols or polyoxyethylened alkylphenols.

A catalyst of the organo-soluble type capable of being used can be represented by organic peroxides, such as lauroyl peroxide, tertiobutyl diethylperacetate, diethylhexylpercarbonate or diacetyl peroxide.

The catalyst or catalysts are employed in relatively high concentrations of between 0.5 to 5 percent by weight based upon the monomeric or comonomeric composition, so that, at the end of the preparation of the seeding latex, a sufficient quantity of catalyst will remain to initiate the polymerization reaction in accordance with the practice of this invention.

In the polymerization embodying the features of this invention, use is made of a seeding latex containing an amount of polymer or copolymer within the range of 1 to 20 percent and preferably within the range of 2 to 6 percent by weight based upon the monomeric or comonomeric composition. The monomeric or comonomeric compositions used in the preparation of the seeding latex are selected in the same group as those polymerized in accordance with the practice of this invention.

According to this invention, the polymer or copolymer formed is insoluble in the initial monomeric or comonomeric medium.

In accordance with the practice of this invention, the polymerization process is applicable to reaction medium formed of vinyl chloride alone; of vinyl chloride and at least one olefin such as ethylene, propylene, butene-1, butene-2, isobutene and methyl-4-pentene-1; of vinyl chloride and vinyl acetate; of vinyl chloride, vinyl acetate and at least one olefin as defined above; of vinyl chloride and vinylidene chloride and other compounds, provided that the copolymers formed are essentially insoluble in the initial monomeric compositions.

The following examples are given by way of illustration, but not by way of limitation, of the various comonomeric compositions which may be copolymerized in accordance with the practice of this invention:

comonomeric compositions based on vinyl chloride and at least one olefin, as defined above, in which the olefin is present in an amount within the range of 0.1 to 30 percent by weight and preferably 0.1 to 10 percent by weight of the comonomeric composition;

comonomeric compositions based upon vinyl chloride and vinyl acetate containing vinyl acetate within the range of 0.1 to 30 percent and preferably 0.1 to 15 percent by weight of the comonomeric composition;

comonomeric compositions based upon vinyl chloride and vinylidene chloride in which the vinylidene chloride is present in an amount within the range of 0.1 to 30 percent by weight and preferably 0.1 to 20 percent by weight of the comonomeric composition.

For a good application of the polymerization process of this invention, there is introduced into the reaction medium with the agency of the seeding latex and/or the monomeric or comonomeric composition, depending on its solubility, a dispersing agent of the emulsifying or protective colloid type in an amount less than 2 percent and preferably in an amount within the range of 0.1 to 0.3 percent by weight based upon the monomeric or comonomeric composition.

Among the emulsifiers capable of being used, the following are given by way of illustration, namely emulsifiers:

of the anionic type such as sulfonate alkali salts having the general formula:

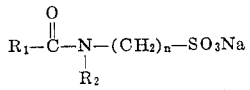
$$R_1-\overset{O}{\underset{\underset{R_2}{|}}{C}}-N-(CH_2)_n-SO_3Na$$

in which $R_1$ and $R_2$ are aliphatic chains having between 1 and 20 carbon atoms such as methyl, ethyl, propyl, butyl, pentyl, octyl, decyl, octadecyl and the like, and n is between 2 and 6, or sulphosuccinate alkali salts having the general formula:

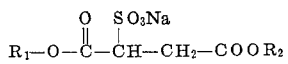
$$R_1-O-\overset{O}{\overset{\|}{C}}-\overset{SO_3Na}{\overset{|}{C}H}-CH_2-COOR_2$$

in which $R_1$ and $R_2$ are aliphatic chains having from 3 to 15 carbon atoms such as propyl, butyl, hexyl, pentylhexyl, decyl, dodecyl, octadecyl and the like;

of the non-ionic type such as ethylene polyoxide grafted by styrene or vinyl acetate or fatty acid polyethoxyesters having the general formula:

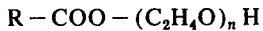
$$R - COO - (C_2H_4O)_n H$$

in which R is an aliphatic chain having from 5 to 20 carbon atoms such as pentyl, octyl, decyl, dodecyl, octadecyl and the like, and n is between 10 and 150. The emulsifiers, as described above, can be used alone or in various admixtures.

Among the protective colloids capable of being used, reference can be made by way of example to methyl cellulose, polyvinyl alcohol, carboxy cellulose and gelatins.

In order to improve the activity of the organo-soluble catalyst or catalysts, it may also be advantageous to introduce into the reaction medium a water soluble activator, such for example as ammonia, sodium sulphoxylate-formaldehyde, sodium metabisulphite with the seeding latex, or an organo-soluble activator such for example as ascorbyl palmitate or hydroxymaleic acid, with the monomeric or comonomeric composition. Any such activator is used in molar dosages generally less than one based upon the catalyst or catalysts of the organo-soluble type contained in the particles of the seeding latex.

The dispersion of the seeding latex is achieved by an appropriate agitation means, and preferably with drastic agitation to provide for finer dispersions. As drastic dispersion means, reference can be made to homogenizers operating under high pressure or turbines rotating at high speed. Dispersion means operating at moderate speed may also be employed.

The polymerization reaction of this invention can be carried out over a wide temperature range, generally within the range of 1° to 90° C. and preferably within the range of 30° to 70° C.

When the reaction medium is raised to the selected polymerization temperature, the unused organo-soluble catalyst or catalysts in the particles of the seeding latex initiate the polymerization of the monomeric or comonomeric composition in the interior of the droplets until the polymeric or copolymeric particle content reaches a value in the range of about 50 percent by weight, at which time a coagulation of the particles occurs within each droplet, and then at the exterior of said droplets without the formation of new particles other than those represented by the droplets initially dispersed. Once the coagulation of the polymeric or copolymeric particles is achieved within the droplets, it becomes also possible to continue the polymerization at low temperature.

The granular size of the end polymer is directly related to the fineness of the initial dispersion of the seeding latex and the number of droplets. Nevertheless, during the course of the polymerization, agglomerations may occur between particles with the result that the final granular size is generally higher than that which might be expected. The kind of catalyst, additive, agitation as well as polymerization temperature influence the agglomeration.

In some cases, the amount of the organo-soluble catalyst or catalysts within the particles of the seeding latex is sufficient for the polymerization of the monomeric or comonomeric compositions to proceed up to a conversion rate above 70 percent without the addition of catalyst.

Generally, however, when a small amount of seeding latex is used or when the latter is only sparingly rich in organo-soluble catalyst, polymerization will case before the conversion rate has reached 70 percent. Continuation of the polymerization reaction can thereafter be obtained by further addition of one or more organo-soluble catalysts. Illustrative of the catalysts which can be used for this purpose are isopropyl peroxidicarbonate, acetylcyclohexane-sulphonyl peroxide or lauroyl peroxide. In order to obtain the homogeneity in distribution, it is desirable to effect catalyst addition while the reaction medium is still liquid, that is to say, before its polymer or copolymer content has reached a value within the range of 25 percent by weight. In spite of this catalyst addition, polymerization proceeds only by addition to the already existing granules.

At the end of the polymerization, and after degassing to remove unreacted monomer, the polymer is subjected to a drying operation to eliminate the small quantity of contained water derived from the seeding latex.

One of the noticeable advantages of the process of this invention is the particularly small amount of encrustation formed on the walls of the reactor. This can be attributed to the absence of free catalyst in the organic phase in contact with the walls during at least a part of the polymerization.

Patentable invention is also believed to exist in the polymers and copolymers that are formed, essentially of the vinyl type, which are insoluble in their monomeric or comonomeric compositions and which are characterized by a very narrow distribution range of between 10 and 50 microns and more preferably between 20 and 40 microns in diameter.

When the polymerization is achieved at a temperature within the range of 50° to 70° C, the compact granules of polymer or copolymer obtained can be used advantageously as a fluidizer of plastisols. Effectively, with regard to fluidizers generally employed, prepared by the process of emulsion polymerization and copolymerization, it affords the advantage of being lower in cost. By reason of its very great fineness, it does not decant in the plastisols. Amounts ranging from 10 to 50 percent by weight, based on the entire quantity of polymer or copolymer used in the plastisols, may be used in place of polymers or copolymers for plastisols prepared by polymerization in emulsion in order to obtain plastisols exhibiting improved rheological properties.

The following examples a re given by way of illustration, but not by way of limitation, of the practice of this invention:

EXAMPLE 1

Preparation of the seeding latex

Into an autoclave of 120 liter capacity, there are introduced 55 kg of vinyl chloride, 2.25 kg of lauroyl peroxide, 0.9 kg of sodium dodecylbenzenesulphonate and 55 kg of water. At room temperature, a succinct dispersion of the organic phase into the aqueous phase is achieved by agitation with a propeller mixer rotating at 100 r.p.m. This predispersion is processed through a homogenizer, commercially available under the name "Manton Gaulin Homogenizer" under a pressure of 200 bars to obtain a fine suspension. The fine suspension is introduced into an autoclave of 120 liter capacity equipped with a propeller mixer rotating at 50 r.p.m. and is heated to 40° C under autogenous pressure. After pressure drop, that is to say, after about 6 hours, the heating is discontinued and the unreacted vinyl chloride is degassed. There is obtained a latex containing 46 percent by weight of polyvinyl chloride, the particles of which have an average diameter of 0.2 micron.

Polymerization according to the process of this invention

Into an autoclave of 1,000 liter capacity, there are introduced 60 liters of the above seeding latex and 500 kg of vinyl chloride in which 1 kg of sodium octylsulphosuccinate has previously been dissolved. The seeding latex is dispersed into the monomer at room temperature by a standard type agitation means in the form of a turbine rotating at 2,900 r.p.m. for 1 hour. This dispersion is then transferred into a vertical autoclave having a capacity of 1,000 liters and equipped with a ribbon type agitator rotating at 100 r.p.m. Polymerization is carried out at a temperature of 60° C. The reaction lasts 10 hours until the pressure begins to drop. After degassing and drying, there is obtained 410 kg of a polymer, the granules of which have a diameter between 20 and 30 microns and which are characterized by properties as set forth in the following table:

TABLE I

| Properties | Product Example 1 |
|---|---|
| Apparent bulk density (g/cm³) | 0.45 |
| Viscosity index AFNOR according to the standard specification NFT 51013 | 105 |
| Average diameter of the granules (microns) | 25 |

This polymer represents an excellent fluidizer for plastisols.

When 20 parts by weight of the polymer is mixed with 40 parts by weight of a polymer for plastisols, such as obtained by emulsion polymerization and marketed under the trade name "LUCOVYL PE 1801," and 40 parts by weight of dioctylphthalate, there is obtained a plastisol the viscosity of which measures 3,000 centipoises at 25° C when measured by means of a viscometer commercially known under the trade name "Drage viscometer."

When 30 parts by weight of this polymer is mixed with 30 parts by weight of the "LUCOVYL PE 1801" and 40 parts by weight of dioctyl phthalate, there is obtained a plastisol having a viscosity of 4,000 centipoises alt 25° C when measured by the "Drage viscometer."

By way of comparison, when 60 parts by weight of "LUCOVYL PE 1801" is mixed with 40 parts by weight of dioctylphthalate, there is obtained a plastisol having a viscosity of 5,000 centipoises when measured at 25° C with a "Drage viscometer."

EXAMPLE 2

Preparation of the seeding latex

Into an autoclave of 120 liter capacity, there are introduced 45 kg of vinyl chloride, 0.9 kg of sodium dodecylbenzene sulphonate and 55 kg of water and, at room temperature, a dispersion of the organic phase into the aqueous phase is achieved by a standard type agitation using a turbine rotating at 2,900 r.p.m. for 1 hour to yield a fine suspension. The said fine suspension is introduced into an autoclave of 120 liter capacity, equipped with a propeller mixer rotating at 50 r.p.m. and then the mixture is heated at 46° C under autogenous pressure. After the pressure drop, that is to say, after about 6 hours, heating is discontinued and unreacted vinyl chloride is degassed. A latex is obtained containing 46% by weight of polyvinyl chloride, the particles of which have an average diameter of 0.6 micron.

Polymerization according to the process of this invention

Into an autoclave of 1,000 liter capacity, there are introduced 15 liters of the above seedling latex to which there has been added 100 cm³ of concentrated ammonia and 500 kg of vinyl chloride in which 1 kg of sodium octylsulphosuccinate has been dissolved. While at room temperature there is achieved a dispersion of the seeding latex into the monomer by means of a turbine rotating at 2,900 r.p.m. for 1 hour. This dispersion is transferred into a horizontal autoclave having a capacity of 1,000 liters and equipped with a gate paddle agitator rotating at 50 r.p.m. Polymerization is carried out at a temperature of 50° C. After 4 hours the reaction stops at a conversion rate of vinyl chloride of about 10 percent. Into the still liquid reaction medium, there is introduced 250 grams of isopropyl peroxidicarbonate. The reaction renews and continues for 6 hours until pressure begins to drop. After degassing and drying, there is obtained 380 kg of a polymer, the granules of which have a diameter within the range of 20 to 30 microns and properties as set forth in the following table:

TABLE II

| Properties | Product of Example 2 |
|---|---|
| Apparent bulk density (g/cm³) | 0.42 |
| Viscosity index AFNOR according to the standard application | |

| | |
|---|---|
| NFT 51013 | 140 |
| Average diameter of the granules (microns) | 25 |

EXAMPLE 3

Preparation of the seeding latex

The seeding latex is prepared in the manner described in Example 2.

Copolymerization representing the practice of this invention

Into an autoclave of 1,000 liter capacity, there are introduced 15 liters of the above seeding latex, 100 cm$^3$ of concentrated ammonia and a mixture of 465 kg of vinyl chloride and 35 kg vinyl acetate in which 1 kg of sodium octylsulphosuccinate has previously been dissolved. The seeding latex is dispersed in the monomeric composition at room temperature by the use of a standard type agitation means in the form of a turbine rotating at 2,900 r.p.m. for 1 hour. This dispersion is transferred into a vertical autoclave of 1,000 liter capacity, equipped with a ribbon type agitator rotating at 100 r.p.m. Polymerization is carried out at a temperature of 60° C, corresponding to a relative pressure of nine bars. After 4 hours, the reaction stops at a conversion rate of monomer of about 10 percent. Into the still liquid reaction medium, introduction is made of 100 grams of isopropyl peroxidicarbonate and 180 grams of lauroyl peroxide. The reaction is renewed and continues for 6 hours. After degassing and drying, there is obtained 400 kg of a copolymer, the granules of which have a diameter within the range of 20 to 60 microns and which are characterized by properties as set forth in the following table:

TABLE III

| Properties | Product Example 3 |
|---|---|
| Apparent bulk density (g/cm$^3$) | 0.48 |
| Viscosity index AFNOR according to the standard specification NFT 51013 | 100 |
| Rate of copolymerized vinyl acetate (%) | 6 |
| Average diameter of the granules (microns) | 0% |

This copolymer is an excellent fluidizer for plastisols and is not detrimental to their gelation ability.

When used herein to define the amounts of various of the ingredients, the term monomer and comonomer compositions is meant to refer to the monomer or comonomer in the absence of any diluents.

It will be understood that changes may be made in the details of formulation and operation without departing from the spirit of the invention, especially as defined in the following claims.

I claim:

1. In a process for the preparation of polymers and copolymers having a vinyl base, the steps of dispersing into the organic vinyl based monomeric system a seeding latex containing 30 to 48 percent by weight of the vinyl based polymer containing organo soluble catalyst in excess of the amount required to form the seed polymer, whereby the seeding latex forms the dispersed phase and the organic monomeric system the continuous phase in which the amount of polymer of the seeding latex dispersed in the monomeric system is within the range of 1–20 percent by weight of the monomer, heating the composition to polymerization temperature whereby polymerization proceeds initially in the interior of the droplets, coagulating the polymer within the droplets, and continuing the polymerization externally of the droplets.

2. A process for the preparation of polymers and copolymers having a vinyl base as claimed in claim 1 in which the seeding latex is prepared by polymerizing in fine suspension monomers or comonomers having a vinyl base with an amount of organo-soluble catalyst in excess of that required to polymerize the monomer to form an aqueous seeding latex in which the polymer or copolymer particles contain excess catalyst of the organo-soluble type and are present in an amount of at least 30 percent by weight of the latex.

3. The process as claimed in claim 2 in which the vinyl base material is vinyl chloride.

4. The process as claimed in claim 2 in which the polymerizing composition is subjected to polymerization under relatively mild agitation.

5. The process as claimed in claim 2 in which the amount of polymer or copolymer in the seeding latex is within the range of 40 to 45 percent by weight.

6. The process as claimed in claim 2 in which the polymer or copolymer particles of the seeding latex have a diameter within the range of 0.03 to 4 microns.

7. The process as claimed in claim 2 in which the polymer or copolymer particles of the seeding latex have a diameter within the range of 0.1 to 2 microns.

8. The process as claimed in claim 2 in which the amount of organo-soluble type of catalyst introduced with the monomers or comonomers used for preparing the seeding latex is within the range of 0.5 to 5 percent by weight based upon the monomeric or comonomeric composition.

9. The process as claimed in claim 2 in which the organo-soluble catalyst used in the preparation of the seeding latex is an organic peroxide catalyst.

10. The process as claimed in claim 9 in which the catalyst is selected from the group consisting of lauroyl peroxide, tertiobutyl diethylperacetate, diethylhexylpercarbonate and diacetyl peroxide.

11. The process as claimed in claim 2 in which the amount of polymer or copolymer of the seeding latex dispersed with the monomer or comonomer of the polymerizing composition is within the range of 2 to 6 percent by weight of the monomer or comonomer of the polymerizing composition.

12. The process as claimed in claim 2 in which a dispersing agent is introduced in the polymerization composition via the seeding latex, or with the monomer or comonomers into which the latex is dispersed.

13. The process as claimed in claim 12 in which the dispersing agent is of the emulsifying type.

14. The process as claimed in claim 12 in which the dispersing agent comprises a protective colloid.

15. The process as claimed in claim 13 in which the dispersing agent is an anionic agent selected from the group consisting of alkali metal sulphonates and sulphosuccinates.

16. The process as claimed in claim 13 in which the dispersing agent is of a non-ionic type selected from the group consisting of ethylene polyoxide grafted by styrene or vinyl acetate, or a fatty acid polyethoxyester.

17. The process as claimed in claim 12 in which the dispersing agent is present in an amount less than 2 percent by weight of the monomeric or comonomeric polymerizing composition.

18. The process as claimed in claim 12 in which the dispersing agent is present in an amount within the range of 0.1 to 0.3 percent by weight of the monomer or comonomers of the polymerizing composition.

19. The process as claimed in claim 14 in which the protective colloid is selected from the group consisting of methyl cellulose, polyvinyl alcohol, carboxy cellulose and gelatin.

20. The process as claimed in claim 2 in which the monomers and comonomers polymerized are selected from the group consisting of vinyl chloride; vinyl chloride and at least one olefin; vinyl chloride and vinyl acetate; vinyl chloride, vinyl acetate and at least one olefin; vinyl chloride and vinylidene chloride.

21. The process as claimed in claim 20 in which the olefin is selected from the group consisting of ethylene, propylene, butene-1, butene-2, isobutene, and methyl-4-pentene-1.

22. The process as claimed in claim 2 in which an activator is introduced via the seeding latex or with the monomer or comonomer into which the latex is dispersed.

23. The process as claimed in claim 22 in which when the activator is introduced via the seeding latex it is selected from the group consisting of ammonia, sodium sulphoxylate formaldehyde and sodium metabisulphite and when the activator is introduced with the monomer or comonomer it is selected from the group consisting of ascorbyl palmitate and hydroxymaleic acid.

24. The process as claimed in claim 22 in which the activator is used in molar dosages less than 1 based upon the catalyst or catalysts of the organo-soluble type contained in the particles of the seeding latex.

25. The process as claimed in claim 2 in which the amount of catalyst contained in the particles of the seeding latex is sufficient for polymerization of the monomeric or comonomeric materials to a conversion rate in excess of 70 percent.

26. The process as claimed in claim 2 in which the polymerizing composition is heated to a temperature within the range of 1° to 90° C for polymerization.

27. The process as claimed in claim 2 in which the polymerizing composition is heated to a temperature within the range of 30° to 70° C for polymerization.

28. The process as claimed in claim 1 in which the polymer is coagulated within the droplets when the polymer particle content is about 50% by weight.

* * * * *